United States Patent
Spanke et al.

(10) Patent No.: US 9,081,087 B2
(45) Date of Patent: Jul. 14, 2015

(54) METHOD FOR ASCERTAINING AND/OR EVALUATING FILL-STATE OF A CONTAINER CONTAINING AT LEAST ONE MEDIUM

(75) Inventors: Dietmar Spanke, Steinen (DE);
Christian Reinau, Schopfheim (DE);
Matthias Boldt, Rummingen (DE);
Alexey Malinovskiy, Lorrach (DE);
Simon Greth, Lorrach (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 563 days.

(21) Appl. No.: 12/314,655

(22) Filed: Dec. 15, 2008

(65) Prior Publication Data
US 2009/0158839 A1    Jun. 25, 2009

(30) Foreign Application Priority Data

Dec. 13, 2007   (DE) .......................... 10 2007 060 579

(51) Int. Cl.
| | |
|---|---|
| G01F 23/00 | (2006.01) |
| G01S 13/08 | (2006.01) |
| G01F 23/284 | (2006.01) |
| G01S 13/88 | (2006.01) |

(52) U.S. Cl.
CPC ............... G01S 13/08 (2013.01); G01F 23/284 (2013.01); G01S 13/88 (2013.01)

(58) Field of Classification Search
CPC ........ G01S 13/08; G01S 13/88; G01F 23/284
See application file for complete search history.

(56) References Cited

U.S. PATENT DOCUMENTS

| | | | | |
|---|---|---|---|---|
| 4,044,355 A | * | 8/1977 | Edvardsson | ................. 73/290 V |
| 2002/0177961 A1 | * | 11/2002 | Lovegren et al. | ............... 702/50 |

FOREIGN PATENT DOCUMENTS

| | | |
|---|---|---|
| DE | 19958584 | 2/2001 |
| DE | 10136754 | 2/2003 |
| DE | 102004052110 | 5/2006 |
| WO | WO 02/25227 | 3/2002 |

* cited by examiner

Primary Examiner — Laura Martin
Assistant Examiner — Alex Devito
(74) Attorney, Agent, or Firm — Bacon & Thomas, PLLC (57) ABSTRACT

A method for ascertaining and/or evaluating the fill-state of a container filled with at least one medium, wherein high-frequency, electromagnetic, measuring signals are emitted by a fill-level measuring device and received back as wanted echos reflected at an interface of the media. The electromagnetic, measuring signals are received back as an end echo reflected at a measuring range end, wherein, from the received wanted echos and the end echo, an echo curve is formed as a function of travel-time and/or the travel-distance, wherein, by means of a search algorithm integrated in the fill-level measuring device, number, existence and/or position of individual wanted echos and of the end echo in the echo curve are/is ascertained and applied for classifying the currently present fill-state in the container relative to predetermined, stored, fill situations in the container. On the basis of the classified fill situation in the container, with a distance value of the fill-level and/or a distance value of the separating-layer are/is associated belonging travel-times and/or belonging travel-distances of the individual wanted echos and/or end echo in the echo curve.

13 Claims, 4 Drawing Sheets

METHOD FOR ASCERTAINING AND/OR EVALUATING FILL-STATE OF A CONTAINER CONTAINING AT LEAST ONE MEDIUM

TECHNICAL FIELD

The invention relates to a method for ascertaining and/or evaluating fill-state of a container containing at least one medium, wherein high-frequency, electromagnetic, measuring signals are emitted from a fill-level measuring device and received back by the fill measuring device as an end echo and/or as wanted echos reflected at least on an upper surface, at least on an interface of media and/or on at least one separating-layer between media.

BACKGROUND DISCUSSION

Methods of this kind are applied, for example, in measuring devices, or field devices, of automation technology and/or process measurements technology, for ascertaining process variables, such as e.g. interface-level, fill-level or separating-layer-level, of at least one medium in a process. Manufactured and sold by the assignee are, for example, measuring devices under the designations Micropilot, Ultrasonic, Levelflex and Multicap, whose primary task is to ascertain and/or monitor fill-level of a medium in a container. In one of a large number of travel-time measuring methods, for example, using guided microwave, time-domain reflectometry, or the TDR-measuring method (Time Domain Reflection), a high-frequency pulse is transmitted along a Sommerfeld or Goubau waveguide, or coaxial waveguide, then subsequently to be partially reflected back at a discontinuity of DK-value (dielectric constant) of a medium surrounding the waveguide. From the time difference between the emitting of the high-frequency pulse and receipt of the echo signal reflected from the medium, fill-level can be ascertained. The FMCW-method (Frequency Modulated Continuous Waves), in which the frequency region of a continuous measurement signal is altered and distance determined from the frequency difference of the transmitted measurement signal relative to the reflected measurement signal, can likewise be performed in connection with the above principle of measurement.

In all known physical measuring principles, most often, a compromise must be made as regards accuracy and reliability of measurement. Thus, based on surrounding conditions and properties of the medium in the particular application, that physical principle of measurement is selected, whose advantages best outweigh its disadvantages. Fundamentally, the freely radiating measuring methods of process measurements technology employ a number of physical principles of measurement, among these being microwave travel-time measurement, ultrasonic travel-time measurement and gamma-ray absorption measurement, as well as, sometimes, also laser-light travel-time measurement. And, the medium-contacting measuring methods of process measurements technology include, among others, plumb-line measuring, capacitive measurement, conductivity measurement and measurement utilizing guided microwaves. All these measuring methods have, as a function of principle of measurement, measured medium, measuring situation, process conditions and measuring performance, have their own particular sets of advantages relative to one another.

Direct comparison of the various physical measuring principles shows that selection of the measurement principle suited for a particular application is, in most cases, very difficult. However, as regards measuring level of a separating layer, already a large number of applications can be handled by the highly developed, medium-contacting measuring devices, or combinations of these measuring devices.

Time-domain reflectometry is a medium-contacting fill-level measuring method, wherein a measuring probe lies directly in contact with the medium being measured. The measuring probe is usually secured in the container via a process connection, opening or nozzle, in such a manner that the associated measuring electronics remains outside the process, i.e. not in contact with the medium. The measuring probe, in contrast, is integrated in the process.

The following references discuss, in greater detail, the measuring of level of a separating layer by means of time domain reflectometry.

EP 1 804 038 A1 discloses a method of ascertaining fill-level of a first medium, e.g. oil, in a container and for identifying presence of a second medium, e.g. water, below the first medium. In this case, microwaves are propagated on a medium-contacting waveguide and, due to discontinuities of wave resistance at disturbance locations or at media interfaces, reflected fractions of the microwaves are received back in the form of echos. A basic idea of this method involves the fact that the probe-end signal from the end of the waveguide has a sign opposite to that of echos from media interfaces. If, now, the level of the second medium reaches the end of the waveguide, the probe-end signal with opposite sign becomes covered by the echo signal of the interface between the first and second medium. So, a sign change of the probe-end signal is detected, when the interface between the first medium, oil, and the second medium, water, reaches the waveguide end.

DE 100 51 151 A1 describes a method and apparatus for detecting an upper interface of an upper liquid and a separating-layer between the upper and a lower liquid. With this method and apparatus, the wanted echos of the interface and the separating-layer, as well as the probe-end echo, are ascertained on the basis of comparison of the amplitudes of the echos with predefined, threshold values, such as e.g. start-threshold, and end-threshold.

Corresponding to the above-presented state of the art, there are various approaches for ascertaining the exact position of the wanted echo signal of the fill-level in the obtained echo curve or in the digitized, envelope curve. Dependent on the exact determining of the measuring position of the fill-level in the echo curve is, however, the accuracy of measurement that can be reached with this echo measuring principle under the given measuring conditions. The above-described methods work, per se, in each case, without problem for a large number of applications. Problems arise, however, always, when the echos of the interface and/or of the separating-layer cannot be unequivocally identified on the basis of the method.

SUMMARY OF THE INVENTION

An object of the invention is to provide a method enabling exact and reliable ascertaining of levels of interfaces, or separating-layers, of media in a container.

This object is achieved according to the invention by a method for ascertaining and/or evaluating fill-state of a container filled with at least one medium, wherein high-frequency, electromagnetic, measuring signals are emitted from a fill-level measuring device and received back by the fill-level measuring device as wanted echos reflected at least on an upper surface, at least on an interface of media and/or on at least one separating-layer between media, wherein the electromagnetic, measuring signals are also received back as an end echo reflected at a measuring range end, wherein, at least from the received wanted echos and the end echo, an echo curve dependent on travel-time and/or travel-distance is formed, wherein, by means of a search algorithm integrated in the fill-level measuring device, number, existence and/or position of individual wanted echos and end echo are/is ascertained in the echo curve and applied for classifying a currently present fill-state in the container relative to predetermined, stored, fill situations in the container, wherein, based on the classified fill situation in the container, with a distance value of fill-level and/or a distance value of a separating-layer are/is associated belonging travel-times and/or belonging travel-distances of individual wanted echos and/or the end echo in the echo curve.

An advantageous form of embodiment of the method of the invention is that wherein the fill situations in the container are predetermined by the search algorithm as partial filling with first medium and/or second medium, filled full with first medium and/or second medium, and empty.

A further advantageous form of embodiment of the solution of the invention solution provides that, on the basis of the search algorithm, number, existence and/or positions of individual wanted echos and end echo are ascertained in predetermined search windows in the echo curve and/or at predetermined search positions in the echo curve.

A very advantageous variant of the method of the invention is that wherein, on the basis of the search algorithm, existence of a first echo in a maximal search window is ascertained in the echo curve, starting from a reference point up to a measuring-range end of the fill-level measuring device, or up to a measuring range end of the fill-level measuring device corrected for propagation velocity in the first medium, and stored as first distance value of the first wanted echo.

An especially advantageous, further development of the method of the invention provides that, on the basis of the search algorithm, existence of a second wanted echo in a limited search window is ascertained, starting from the first distance value of the first wanted echo up to a measuring range end of the fill-level measuring device corrected for different propagation velocities in the media, and is stored as second distance value of the second wanted echo.

A preferred form of embodiment of the method of the invention provides that, on the basis of the search algorithm, existence of the end echo is ascertained at predetermined search positions in the echo curve corrected for different propagation velocities in the media.

In an advantageous form of embodiment of the method of the invention, it is provided, that search windows and search positions are produced by the search algorithm as functions of propagation velocities of the high-frequency, electromagnetic, measuring signal in the first medium and/or in the second medium.

A purpose-supporting example of an embodiment of the method of the invention provides, that different propagation velocities of the high-frequency, electromagnetic, measuring signal in the media are calculated by the search algorithm in proportion to the square root of dielectric constants of the media.

A purpose-supporting, alternative example of an embodiment of the method of the invention provides, that the dielectric constants of the media are input to the search algorithm by an operator at start-up of the fill-level measuring device.

In a preferred form of embodiment of the method of the invention, it is provided, that a known thickness of the first medium is input by an operator as a difference value of the first distance value and the second distance value, and a current dielectric constant of the first medium is ascertained therefrom.

A preferred form of embodiment of the method of the invention provides, that, as fill situation, a full, or partial, filling of the container with only the first medium is input by the operator, and, from the ascertained first wanted echo and travel-time shift of the end echo of the probe-end in the echo curve relative to a known probe length, the current dielectric constant of the first medium is ascertained.

An advantageous form of embodiment of the solution of the invention provides, that the dielectric constants of the media are ascertained by the search algorithm by means of reflections of the electromagnetic echo signal on disturbing elements at a fixedly predetermined separation.

In an additional advantageous embodiment of the method of the invention, it is provided, that the operator inputs to the search algorithm, at start-up of the fill-level measuring device, the fill situation "always filled full". For the case, that the container remains "always filled full" and no wanted echos are detected from the interface of the media, the operator can input to the search algorithm, at start-up of the fill-level measuring device, the fill situation "always filled full". In this case, the search window of the first echo is enlarged to the measuring range end corrected for the propagation velocity in the first medium, and search for a second echo is omitted.

A further advantageous embodiment of the method of the invention provides, that the search algorithm is constructed of fixedly wired, electrical components in the fill-level measuring device.

A very advantageous variant of the method of the invention is that wherein the search algorithm is embodied in the form of an application program in the fill-level measuring device.

A purpose-supporting, alternative example of an embodiment of the method of the invention provides, that the high-frequency, electromagnetic, measurement signal is propagated, and received back, along a process contacting measuring probe of the fill-level measuring device, which is embodied as a time-domain reflectometer.

An advantageous form of embodiment of the solution of the invention provides, that the high-frequency, electromagnetic measurement signal is radiated and received back via a freely radiating antenna of the fill-level measuring device embodied as a radar measuring device.

Other details, features and advantages of the subject matter of the invention will be evident from the following description with its associated drawings, in which preferred examples of embodiments of the invention are illustrated. Elements similar in construction and/or function in the examples of embodiments of the invention illustrated in the figures are, for better overview and for simplification of the elements, provided with equal reference characters.

DETAILED DISCUSSION

Figure 1:
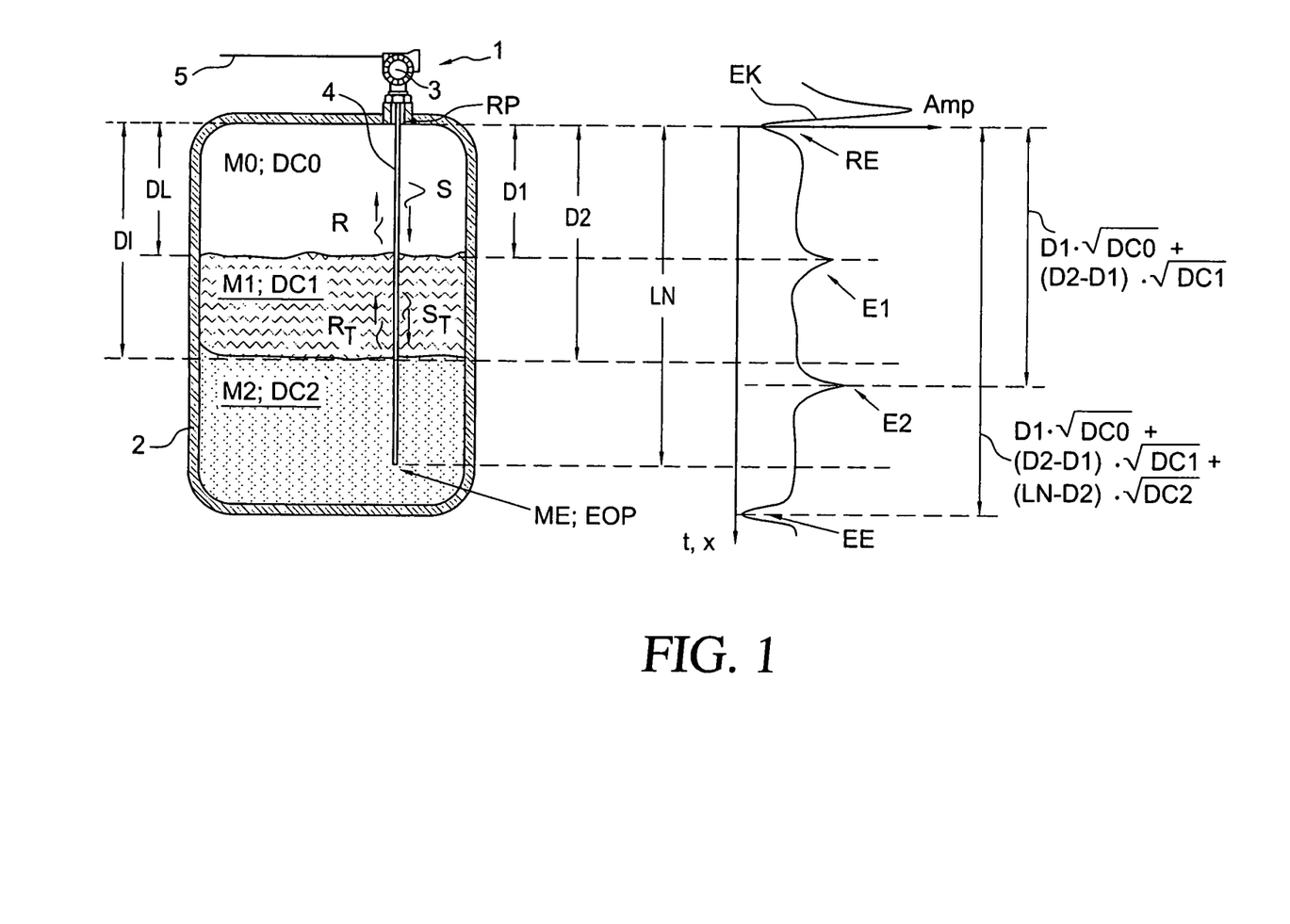
FIG. 1 a first schematic drawing of a container partially filled with two different media, with the drawing including an echo curve as a function of travel-distance and travel-time of the high-frequency, electromagnetic, measuring signals of an installed fill-level measuring device.

FIG. 1 shows a first fill situation of a container 2 having a fill-level measuring device 1 mounted via a nozzle on the container. Fill-level measuring device 1 is, in this example of an embodiment, embodied in the form of a medium-contacting, time-domain reflectometer. Such time-domain reflectometers are also referred to in the English language literature as TDR fill-level measuring devices 1.

The time-domain reflectometer works according to the following measuring principle: Via measuring probe 4, e.g. a Sommerfeld, or Goubau, surface waveguide, or a coaxial waveguide, high-frequency, electromagnetic, measuring signals are sent as transmission signal, or transmission pulse, S in the direction of the media M1, M2, and, thus, into the process space of the container 2. Signal, or pulse, S is subsequently partially reflected back, either due to a DK-value jump in, or a discontinuity of, the dielectric constants DC0, DC1, DC2 of the media M0, M1, M2 surrounding the measuring probe 4, as wanted echo signals E1, E2 or, due to a change in the geometry of the measuring probe 4, as disturbance echo signals. A discontinuity of the wave resistance occurs, for example, at the interface between the air M0 and the first medium M1, when the dielectric constant DC0 of the air M0 in the process space of the container 2 is smaller than the dielectric constant DC1 of a first medium M1. Furthermore, such a discontinuity of the wave resistance arises, for example, at the separating-layer I between a first medium M1 and a second medium M2. These two media M1, M2 must not mix, in order that a separating-layer I for reflection of the transmission signal S can form. The dielectric constant DC1 of the first medium M1 is smaller than the dielectric constant DC2 of the lower, second medium M2, in order that a measuring of the separating-layer I is even possible. With the help of the measured travel-time t and with knowledge of the propagation velocity of the high-frequency, electromagnetic measurement signals, application of a formula ascertains the traveled, one-way distance x. The fill-level L of the media M1, M2 in the container 2 corresponds to the height 6 of the container, or of the site of the in-coupling of the high-frequency, electromagnetic measurement signals onto the measuring probe 4, minus the one-way travel-distance x of the high-frequency, electromagnetic, measuring signals. Since the height of the container 2 is known, the height of the fill-level L of the first medium M1, the height the separating-layer I between the media M1, M2 and/or the volume of the media M1, M2 in the container 2 can be ascertained.

A separating-layer I forms when at least two different, immiscible media M1, M2 are present in the container 2. In order to be able to measure the amounts, or volumes, of both media M1, M2 separately, it is necessary that the distance value D1 to the separating-layer between the two media M1, M2 be ascertained. For this, in addition to the first wanted echo E1 from the interface of the first medium M1, a second wanted echo E2 from the separating-layer I between the first medium M1 and the second medium M2 is registered. In order that this second wanted echo E2 can be ascertained, it is necessary, that not all the energy of the transmission signal S be reflected at the upper surface 13 of the first medium M1, but, instead, a part of the transmission signal S must be transmitted as transmission signal ST in the first medium M1. The degree of transmission and reflection of the transmission signal S depends mainly on the dielectric constants DC1, DC2 of the media M1, M2 being measured.

An echo curve EK mapping the fill situation in the container 2 is plotted in proportion to the travel-distance x of the transmission signal S. For better presentation, the plots in FIG. 1 and FIG. 3 are rotated to be parallel to the height of the tank, and fill-level L, separating-layer I, and measuring range end ME are shown as they relate to the echo curve EK via reference lines, along with the corresponding reference echo RE, the wanted echos E1, E2 and the end echo EE, so that the cause-effect-principle as regards reflection of the transmission signal S due to the changing of the wave resistance at interfaces or separating surfaces of the media M1, M2 can be understood at a glance.

A reference point RP fixes the position where the measuring range of the fill-level measuring device 1 begins. In the case of the medium-contacting, time-domain reflectometer, the reference point RP is the transition of the measuring probe 4 from the nozzle into the widened, process space of the container 2. In the case of freely radiating, fill-level measuring devices 1, the reference point RP is set by a block distance of the sensor elements and/or the arrangements of the radiating elements, such as e.g. horn antenna, parabolic antenna, planar antenna and/or rod antenna. The measuring range end ME is set, in the case of a time-domain reflectometer, by the probe-end EOP of the measuring probe 4, and, in the case of freely radiating fill-level measuring devices, by the floor of the container 2 or by the maximum attenuation of the transmission signal S by the media M1, M2. The measuring range end ME is indicated in the echo curve EK by the end echo EE. In the case of the time-domain reflectometer, the end echo EE is negative in sign.

Figure 3:
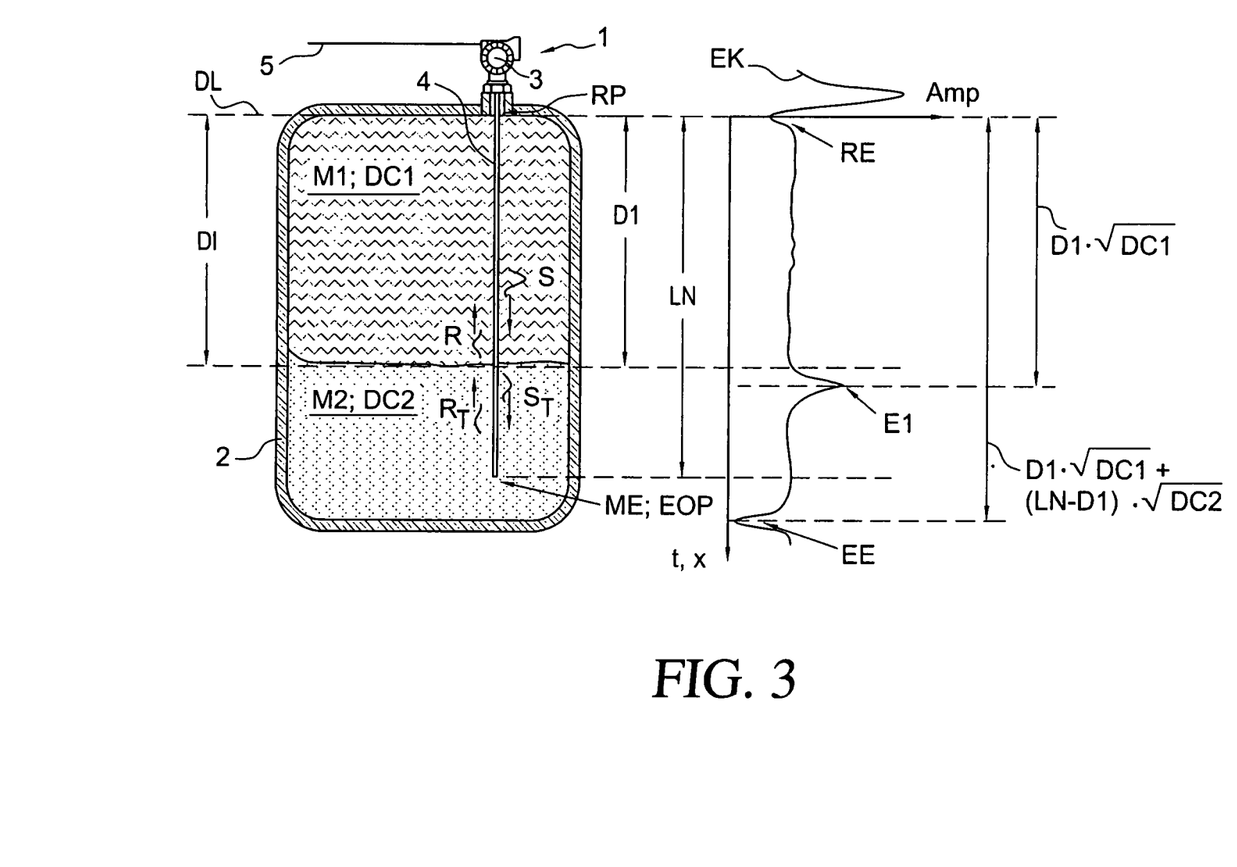
FIG. 3 a second schematic drawing of a container filled full with two different media, with the drawing including an echo curve as a function of travel-distance and travel-time of the high-frequency, electromagnetic, measuring signals of an installed fill-level measuring device.

In the beginning region of the echo curve EK in FIGS. 1 and 3, a decay behavior, or so-called ringing, is to be seen, which can arise due to multiple reflections or, also, due to accretion formation in the transmitting/receiving element, or nozzle. Such disturbance echo signals are referred to in English also as "clutter". The travel-distance x, or the travel-time t, is measured on the abscissa and the amplitude value Amp on the ordinate of the Cartesian coordinate system of the graph of the echo curve EK.

The high-frequency, electromagnetic, measuring signals are produced, for example, as transmission signal S with a bandwidth of 0-1.5 GHz in the HF-unit in the measurement transmitter 3 of the time-domain reflectometer and coupled by means of a probe coupling element into, or onto, the measuring probe 4. The high-frequency, electromagnetic, measuring signals propagate almost with the speed of light along the measuring probe 4, therefore resulting in very short travel-times t. In the case of resolution down to a millimeter in the measurement of fill-level L or separating-layer level I, differences in travel-time t in the picoseconds range must be detected. Measurement of such small travel-times is only possible using special electronic components and high measurement complexity. Therefore, most often, by means of sequential sampling, the reflected echo signal, including at least the wanted echo signals E1, E2 and the disturbance echo signals, is transformed into a low-frequency, intermediate signal. This intermediate signal is, for example, produced by the mixer principle from a transmission signal S and a sampling pulse signal phase-shifted with respect thereto. From this intermediate signal, subsequently in a control/evaluation unit integrated in the measurement transmitter 3, a digitized echo curve EK is formed, which can be appropriately further processed, evaluated and/or filtered.

The, for example, wanted echo signals E1 traveling back from the interface of the first medium M1 are, in turn, received in the HF-unit, and, preferably, conditioned to a time-expanded, intermediate signal as above described. This conditioned intermediate signal is then further processed measurements-technically and signal-technically in the control/evaluating unit, for example, by filtering and smoothing.

The transmission signal S is partially reflected back at the interface from air M0 to first medium M1 as reflection signal R and received as a first useful echo E1. The travel-distance x, which the transmission signal S travels from the reference point RP up to this first wanted echo E1, results in a first distance value D1 of the first wanted echo E1. The other part of the transmission signal S continues as transmission signal ST through the first medium M1 and is at least partially reflected, due to the discontinuity between the dielectric constants DC1, DC2 at the separating-layer I between the first medium M1 and the second medium M2, as transmitted reflection signal RT, from which a second distance value D2 of the second wanted echo E2 is ascertained. The remaining transmission signal S is almost completely reflected at the probe-end EOP as end echo EE, whereby a probe length LN is ascertained.

The travel-times t of the transmission signals S, the transmission signals ST, the reflection signals R and the transmitted reflection signal RT and, thus, the ascertained values for the individual, wanted echos E1, E2 or the echos of the probe-end EOP, depend on the different propagation velocities of the high-frequency, electromagnetic, measuring signal in the different media M0, M1, M2. The propagation velocity of the high-frequency, electromagnetic, measuring signals is proportional to the square root of the dielectric constant DC0, DC1, DC2 of the different media M0, M1, M2 in the container 2. The shifting of the wanted echo E1, E2 and of the end echo EE in the echo curve EK can be calculated with knowledge of the dielectric constants DC0, DC1, DC2 of the media M0, M1, M2. The corrected distance value of the first wanted echo E1 corresponds, thus, to the following first formula, wherein the dielectric constant DC0 of air M0 is, most often, 1.

$$E1 \propto D1\sqrt{DC0}$$

The corrected distance value of the second wanted echo E2 can be calculated by a second formula from the shifted second wanted echo E2 in the echo curve EK.

$$E2 \propto D1\sqrt{DC0}+(D2-D1)\sqrt{DC1}$$

The corrected distance value of the end echo EE of the probe-end EOP in echo curve EK is described by a third formula.

$$EE \propto D1\sqrt{DC0}+(D2-D1)\sqrt{DC1}+(LN-D2)\sqrt{DC2}$$

The so-obtained distance value DL of the fill-level, the distance value DI of the separating-layer level, or the echo curve EK mapping the entire measured situation, which represents the envelope of the intermediate signal prepared by superpositioning the transmission signal S, the disturbance echo signals and the wanted echo signal E1, E2, are forwarded, for example, via a bus interface integrated in the measurement transmitter 3, on the communication line 5 to, for example, a control station and/or further field devices. The distance value of the fill-level DL, the distance value of the separating-layer level DI or the echo curve EK can, however, also be presented on an output/input unit of the fill-level measuring device 1 integrated in the measurement transmitter 3.

Energy supply of the fill-level measuring device 1 is provided by means of a communication line 5, for example, as implemented by two-wire-line, or fieldbus. An additional supply line for energy supply is omitted, when the fill-level measuring device 1 is a so-called two-conductor measuring device, whose communication needs and energy supply are accomplished exclusively and simultaneously via the communication line 5. Data transmission or communication via the communication line 5 is effected, for example, according to the CAN-, HART-, PROFIBUS DP-, PROFIBUS FMS-, PROFIBUS PA-, or FOUNDATION FIELDBUS-standard.

Figure 2:
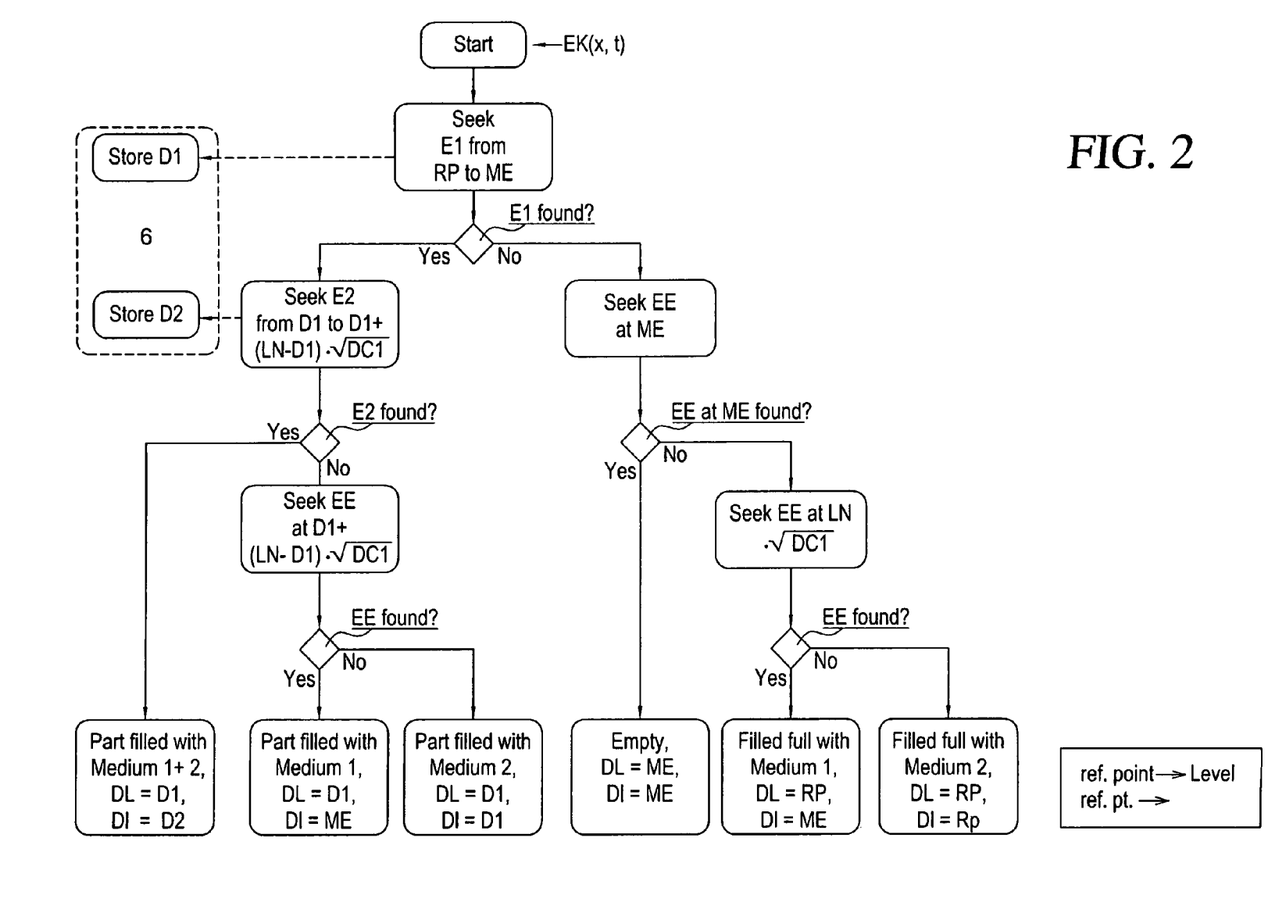
FIG. 2 a first example of a schematic flow diagram of the search algorithm for ascertaining fill-state in the container.

A first flow diagram of a search algorithm integrated in the fill-level measuring device 1 for ascertaining fill-state in a container 2 partially filled with up to two media M1, M2 is presented in FIG. 2. The current echo curve EK is ascertained by the fill-level measuring device 1, such as has already been described above. In a first step, the search algorithm analyzes whether a first wanted echo E1 exists in the current echo curve EK, from the reference point RP up to the measuring range end ME. If is a first wanted echo E1 is found in this first range, the position of this wanted echo E1 in the current echo curve EK is stored, as first distance value D1, in a memory unit 6 integrated in the fill-level measuring device 1. Furthermore, after proof of the existence of the first wanted echo E1, a possible second wanted echo E2 due to the separating-layer I between the two media M1, M2 in the current echo curve EK is sought, starting from the position of the first wanted echo E1 up to the measuring range end ME corrected for the propagation velocity. If is a second wanted echo E2 is found in this second range, then the position of the second wanted echo E2 is stored as second distance value D2 in the memory unit 6 and the fill situation of the container 2 is classified by the search algorithm as "partially filled with first medium M1 and second medium M2". If no wanted echo E1, E2, or only the first wanted echo E1, is found by the search algorithm in the current echo curve EK, the position of the end echo EE provides further information concerning the possible fill situations of the container 2. If, for example, no second wanted echo E2 is found in the current echo curve EK, the end echo EE is sought in the case of corrected measuring range end ME, on the basis of the result of which the fill situation is classified as "partially filled only with first medium M1" or "partially filled with only second medium M2". If no wanted echo E1, E2 is found in the current echo curve EK, then, on the basis of a search for the end echo EE at the measuring range end ME and the one medium M1, M2 having a dielectric constant DC1, DC2, the fill situation in the container 2 is classified as "empty", "filled full with first medium M1" or "filled full with second medium M2".

The current search path, due to the fill situation of partial filling with a first medium M1 and a second medium M2 shown in FIG. 1, is brought out in the search algorithm in FIG. 2 particularly by a bolder font and thickened lines.

FIG. 3 illustrates a second possible fill situation of the container 2, in the case of which the container 2 is filled completely with an upper, first medium M1 and a lower, second medium M2. In this fill situation of the container 2, the time-domain reflectometer sends the transmission signal S along the measuring probe 4 through the first medium M1. The first medium M1 reaches to, or into, the nozzle. This is evident in the echo curve EK also by the fact that the echo of the reference point RP has a smaller amplitude and is slightly shifted in time. The transmission signal S is reflected at the separating-layer I between the first medium M1 and the second medium M2 as reflection signal R. Reflection signal R of the separating-layer I is detected by the time-domain reflectometer as the first wanted echo E1. The travel-time delay due to the somewhat smaller propagation velocity of the high-frequency, electromagnetic, measuring signals in the first medium M1 is proportional to the square root of the dielectric constant DC1 of the first medium M1, this leading to a shifting of the position of the first wanted echo E1 in the echo curve EK according to the fourth formula.

$$E1 \propto D1\sqrt{DC1}$$

As already above described, the transmission signal is partially transmitted at the separating-layer I as transmission signals ST into the second medium M2 and partially reflected back as reflection signal R. The transmission signal ST is almost completely reflected at the probe-end EOP. The shifting of the end echo EE of the probe-end EOP in the ascertained echo curve EK is described by a fifth formula.

$$EE \propto D1\sqrt{DC1} + (LN-D1)\sqrt{DC2}$$

The fill-level measuring device 1 in the container 2 can also be installed from below. Through an input of the values, or estimated values, of the dielectric constants DC0, DC1, DC2 of the media M0, M1, M2 by the operator at start-up, the search algorithm can, on the basis of the ascertaining of the current propagation velocities of the electromagnetic, measuring signals, ascertain the layer sequence of the media M0, M1, M2. In the case of an installation of the fill-level measuring device 1 from above, for example, a sequence of lessening values of the ascertained propagation velocities or dielectric constants DC0, DC1, DC2 in the different media M0, M1, M2 is ascertained. In the case of an installation of the fill-level measuring device 1 from below, a sequence of increasing values of the ascertained propagation velocities or dielectric constant DC0, DC1, DC2 in the media M0, M1, M2 is ascertained.

Figure 4:
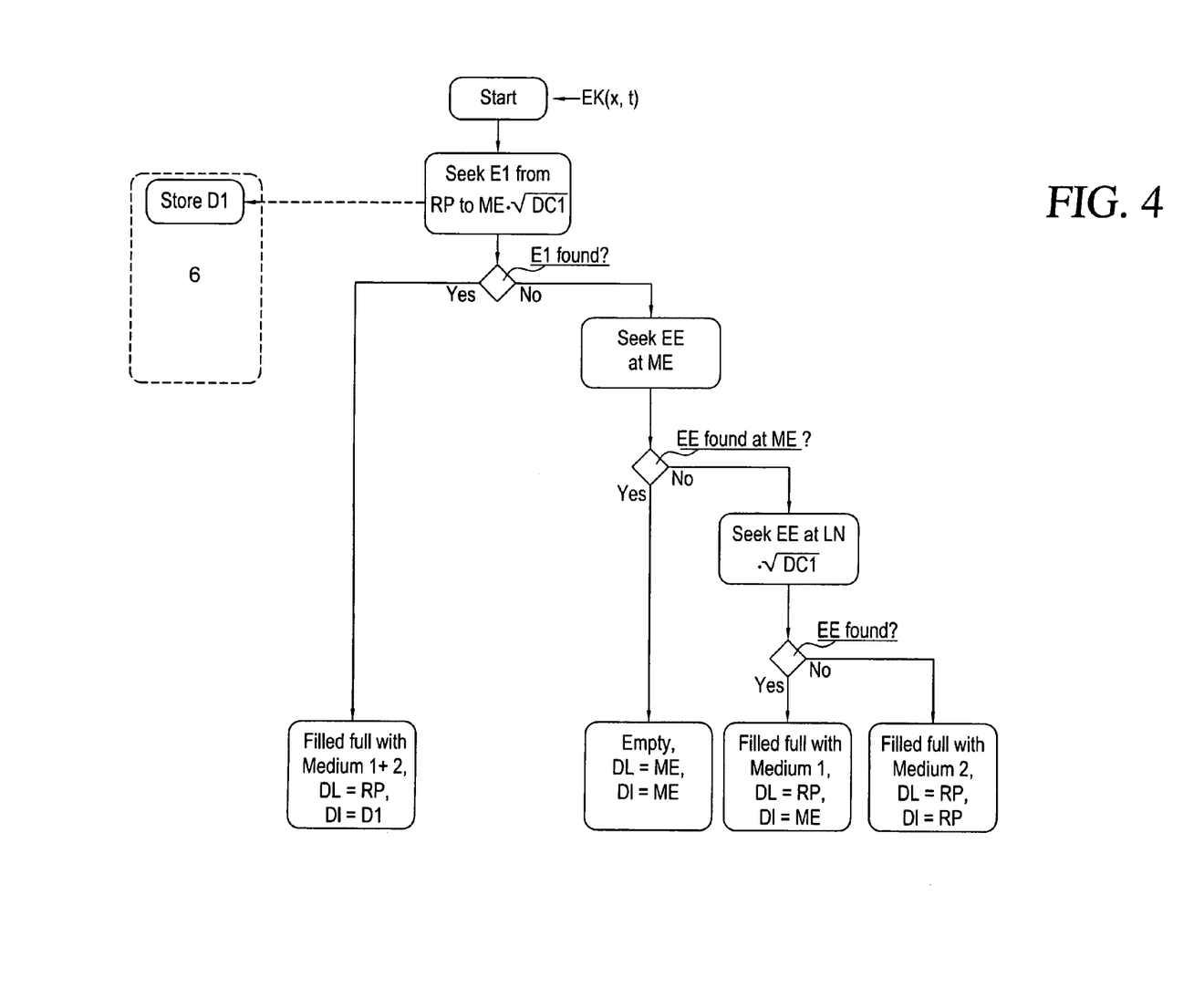
FIG. 4 a second example of a schematic flow diagram of the search algorithm, in the case of which the operator has input the fill situation "always filled full".

A second flow diagram of a search algorithm integrated in the fill-level measuring device 1 for ascertaining fill-state in the container 2 filled full with up to two media M1, M2 is presented in FIG. 4. For example, the operator, at start-up of the fill-level measuring device 1, inputs to the search algorithm the particular fill situation "always filled full" and the device then works according to the special search algorithm shown in FIG. 4. The current echo curve EK is ascertained by the fill-level measuring device 1 in manner such as already described above. The search algorithm analyzes in a first step in the current echo curve EK, starting from the reference point RP up to the measuring range end ME corrected based on the propagation velocity in the first medium M1, for the existence a first wanted echo E1 and, on finding the first wanted echo E1, stores its first distance value D1 in a memory unit 6 integrated in the fill-level measuring device 1. If, on the other hand, no wanted echo E1 is found in the current echo curve EK by the search algorithm, then the position of the end echo EE again gives further information concerning the possible fill situations of the container 2.

In the fill situation of FIG. 3, where the container is filled full with a first medium M1 and a second medium M2, the search algorithm detects the existence of the first wanted echo E1 and classifies the fill situation as "filled full with medium 1+2".

The difference of the second flow diagram compared with first flow diagram of the search algorithm is that, after detecting existence of the first wanted echo E1, the classification of the fill situation in the container 2 is completed.

The current search path for the fill situation shown in FIG. 3, i.e. filled full with a first medium M1 and a second medium M2, is specially emphasized in the search algorithm in FIG. 4 by bolder lettering and thickened lines.

Further search conditions or search steps in the search algorithm for additionally developing the ascertaining of fill situations are conceivable.

The invention claimed is:

1. A method for ascertaining and/or evaluating a fill-state of a container filled with at least one medium, comprising the steps of:
    emitting high-frequency, electromagnetic, measuring signals from a fill-level measuring device and receiving back by the fill-level measuring device as useful echos reflected at least on an upper surface, at least on an interface of media and/or on at least one separating-layer between media;
    receiving back the electromagnetic, measuring signals as an end echo reflected at a measuring range end;
    forming an echo curve dependent on travel-time and/or travel-distance at least from the received useful echos and the end echo;
    ascertaining by means of a search algorithm integrated in a memory unit in the fill-level measuring device, number, existence and/or position of individual useful echos and end echo in the echo curve, which are applied for classifying a currently present fill-state in the container relative to predetermined, stored, fill situations in the container; and
    based on said classified currently present fill-state in the container a distance value of a fill-level and/or a distance value of a separating-layer are/is associated with travel-times and/or with travel-distances of individual useful echos and/or the end echo in the echo curve, wherein:
    the fill situations in the container are given by the search algorithm as partially filled with a first medium or a second medium, filled full with the first medium and/or the second medium, or empty.

2. The method as claimed in claim 1, wherein:
    based on the search algorithm, number, and/or positions of individual useful echos and end echo are ascertained in predetermined search windows in the echo curve.

3. The method as claimed in claim 2, further comprising the step of:
    producing search windows by the search algorithm as functions of propagation velocities of the high-frequency, electromagnetic, measuring signal in the first medium and/or in a second medium.

4. The method as claimed in claim 1, wherein:
    based on the search algorithm, existence of a first useful echo in a maximal search window from a reference point up to a measuring range end of the fill-level measuring device, or up to the measuring range end corrected based on propagation velocity in the first medium, is ascertained from the echo curve and stored as first distance value of the first useful echo.

5. The method as claimed in claim 1, wherein:
    based on the search algorithm, existence of the second useful echo in a limited search window, starting from a first distance value of the first useful echo up to the measuring range end corrected based on different propagation velocities in the media, is ascertained and stored as second distance value of the second useful echo.

6. The method as claimed in claim 5, further comprising the step of:
    ascertaining the unknown dielectric constants of the media by the search algorithm by means of reflections of the electromagnetic echo signal on disturbing elements at a fixedly predetermined distance.

7. The method as claimed in claim 6, wherein:
    different propagation velocities of the high-frequency, electromagnetic, measuring signal in the media are calculated by the search algorithm in proportion to square root of predetermined dielectric constants of the media.

8. The method as claimed in claim 7, wherein:
the predetermined dielectric constants of the media are input by an operator to the search algorithm at start-up of the fill-level measuring device.

9. The method as claimed in claim 1, wherein:
based on the search algorithm, existence of the end echo is ascertained from the echo curve at predetermined search positions in the echo curve corrected based on different propagation velocities in the media.

10. The method as claimed in claim 1, wherein:
the search algorithm is embodied on fixedly wired, electrical components in the fill-level measuring device.

11. The method as claimed in claim 1, wherein:
the search algorithm is embodied as an application program in the fill-level measuring device.

12. A method for ascertaining and/or evaluating a fill-state of a container filled with at least two mediums, comprising the steps of:
emitting high-frequency, electromagnetic, measuring signals from a fill-level measuring device and receiving back by the fill-level measuring device as useful echos reflected at least on an upper surface, at least on an interface of media and/or on at least one separating-layer between media;
receiving back the electromagnetic, measuring signals as an end echo reflected at a measuring range end;
forming an echo curve dependent on travel-time and/or travel-distance at least from the received useful echos and the end echo;
ascertaining by means of a search algorithm integrated in a memory unit in the fill-level measuring device, number, existence and/or position of individual useful echos and end echo in the echo curve, which are applied for classifying a currently present fill-state in the container relative to predetermined, stored, fill situations in the container; and
based on said classified, currently present fill-state in the container, a distance value of a fill-level and/or a distance value of a separating-layer are/is associated with travel-times and/or with travel-distances of individual useful echos and/or the end echo in the echo curve, wherein:
the fill situations in the container are given by the search algorithm as partially filled with a first medium or a second medium, filled full with the first medium and/or the second medium, or empty; and
a known thickness of the first medium is input by an operator as a difference between the first distance value and a second difference distance value and current unknown dielectric constant of the first medium is ascertained therefrom.

13. A method for ascertaining and/or evaluating a fill-state of a container filled with at least one medium, comprising the steps of:
emitting high-frequency, electromagnetic, measuring signals from a fill-level measuring device and receiving back by the fill-level measuring device as useful echos reflected at least on an upper surface, at least on an interface of media and/or on at least one separating-layer between media;
receiving back the electromagnetic, measuring signals as an end echo reflected at a measuring range end;
forming an echo curve dependent on travel-time and/or travel-distance at least from the received useful echos and the end echo;
ascertaining by means of a search algorithm integrated in a memory unit in the fill-level measuring device, number, existence and/or position of individual useful echos and end echo in the echo curve, which are applied for classifying a currently present fill-state in the container relative to predetermined, stored, fill situations in the container;
based on said classified, currently present fill-state in the container, a distance value of a fill-level and/or a distance value of a separating-layer are/is associated with travel-times and/or with travel-distances of individual useful echos and/or the end echo in the echo curve; and
a full or partial filling of the container with only the first medium is predetermined by an operator as fill situation, and from the ascertained first useful echo and a travel-time shift of the end echo of the probe-end in the echo curve relative to known probe length, a current unknown dielectric constant of the first medium is ascertained, wherein:
the fill situations in the container are given by the search algorithm as partially filled with a first medium or a second medium, filled full with the first medium and/or the second medium, or empty.

* * * * *